(12) United States Patent
Fang

(10) Patent No.: US 7,293,764 B2
(45) Date of Patent: Nov. 13, 2007

(54) ADJUSTING MECHANISM WITH A HELICAL SPRING OF LARGE DIAMETER

(75) Inventor: Hsiu-Chun Fang, Tainan (TW)

(73) Assignee: Neotek Co., Ltd., Taipei (TW)

( * ) Notice: Subject to any disclaimer, the term of this patent is extended or adjusted under 35 U.S.C. 154(b) by 0 days.

(21) Appl. No.: 11/346,357

(22) Filed: Feb. 3, 2006

(65) Prior Publication Data

US 2007/0182079 A1    Aug. 9, 2007

(51) Int. Cl.
*F16F 13/00*      (2006.01)
(52) U.S. Cl. ............................................. 267/220
(58) Field of Classification Search ............... 267/34, 267/175–179, 221, 319.2
See application file for complete search history.

(56) References Cited

U.S. PATENT DOCUMENTS

| | | | | |
|---|---|---|---|---|
| 5,044,614 A | * | 9/1991 | Rau | 267/221 |
| 5,477,948 A | * | 12/1995 | Stevens | 267/221 |
| 5,553,836 A | * | 9/1996 | Ericson | 267/286 |
| 5,803,443 A | * | 9/1998 | Chang | 267/221 |
| 5,954,318 A | * | 9/1999 | Kluhsman | 267/175 |
| 6,065,573 A | * | 5/2000 | Kelly | 188/319.1 |
| 6,827,184 B1 | * | 12/2004 | Lin | 188/321.11 |
| 2004/0195745 A1 | * | 10/2004 | Oliver et al. | 267/221 |

* cited by examiner

*Primary Examiner*—Christopher P. Schwartz
(74) *Attorney, Agent, or Firm*—Troxell Law Office, PLLC

(57) ABSTRACT

An adjusting mechanism with a spring, particularly an adjusting mechanism with a helical spring of large diameter, is disclosed, the thread grooves of an inner bore of a rotation member being primarily used to allow the helical spring of large diameter fixed to the spring-fixed base to glide. When the rotation member rotates and axially shifts, the number of compressed coils of the helical spring of large diameter changes, thereby a spring coefficient of the helical spring of large diameter is changed.

7 Claims, 2 Drawing Sheets

ADJUSTING MECHANISM WITH A HELICAL SPRING OF LARGE DIAMETER

FIELD OF THE INVENTION

This invention relates to an adjusting mechanism with a spring and particularly to an adjusting mechanism with a helical spring of large diameter, having a simplified structure so that a spring coefficient of the helical spring of large diameter is adjustable.

BACKGROUND OF THE INVENTION

The spring coefficient of a conventional helical spring is made according to a predetermined specification before the spring is produced, so it is usually not available to be used in various mechanisms. Thus, a special spring that is adjustable is provided, but the cost of development and manufacturing is high.

To improve what is mentioned above, an invention of Taiwan Patent No. 436588, titled "Adjustable Casing for Helical Spring", was disclosed. The device includes male and female cases and a rotation member, characterized in that two ends of a helical spring are respectively mounted to a fixed base in the center of the bottom of the female case and to the inside of the male case. A plurality of resists of the outer or inner bore of the rotation member contact the coil of spring, and thus the rotation member is rotated to change the number of compressed coils of the helical spring that receives a compressive force or tension, thereby the spring coefficient of the helical spring is adjusted. However, the adjustable helical spring mentioned above, especially the helical spring of large diameter, when actually used, results in various problems.

In consideration of the mentioned-above defects of the prior art, this inventor provide this invention having reasonable and effective improvements of the defects of the conventional structures mentioned above.

SUMMARY OF THE INVENTION

It is an object of this invention to mainly provide an adjusting mechanism with a helical spring of large diameter. When a rotation member is rotated, thread grooves of an inner bore of the rotation member rotate along the coil of the helical spring of large diameter and axially shift so that the number of compressed coils of the helical spring of large diameter changes, thereby changing a spring coefficient of the helical spring of large diameter.

It is another object of this invention to provide an adjusting mechanism with a helical spring of large diameter that is especially useful in a shock absorber device, in which the valid number of compressed coils of the helical spring of large diameter is adjusted, thereby the spring coefficient and stroke being adjusted for adaptation to various operation environments.

It is further an object of this invention to provide an adjusting mechanism for a helical spring of large diameter. When the flexibility of the helical spring of large diameter is exhausted, the device is used to adjust the number of compressed coils and thus the spring coefficient recovers, thereby prolonging the service life of spring.

In order to further understand the features and technical means of this invention, please refer to the detailed description according to this invention accompanied with drawings; however, the accompanied drawings are provided for reference and illustration only and do not limit to this invention.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
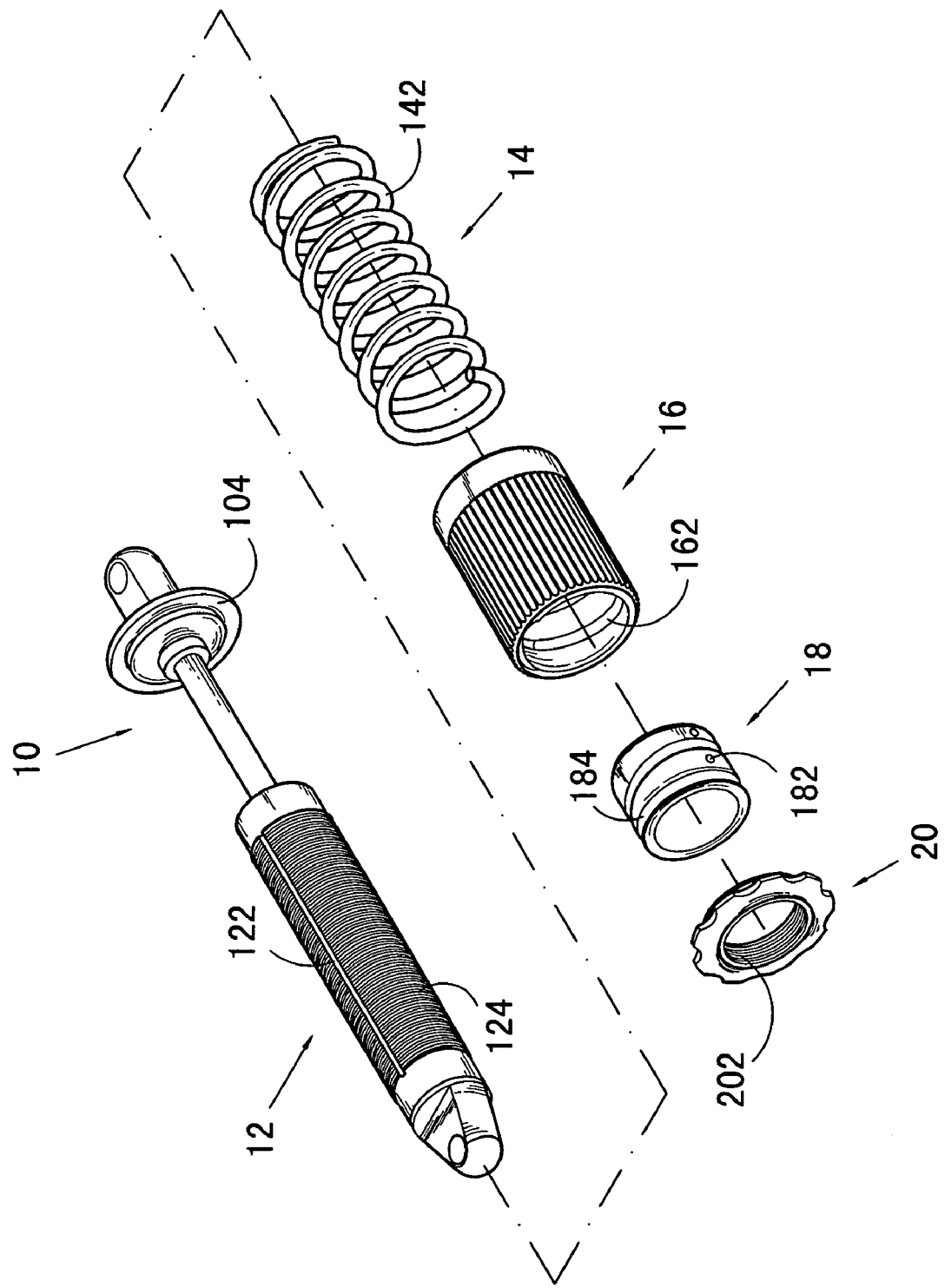
FIG. 1 is an exploded view of an adjusting mechanism with a helical spring of large diameter according to this invention.
Figure 2:
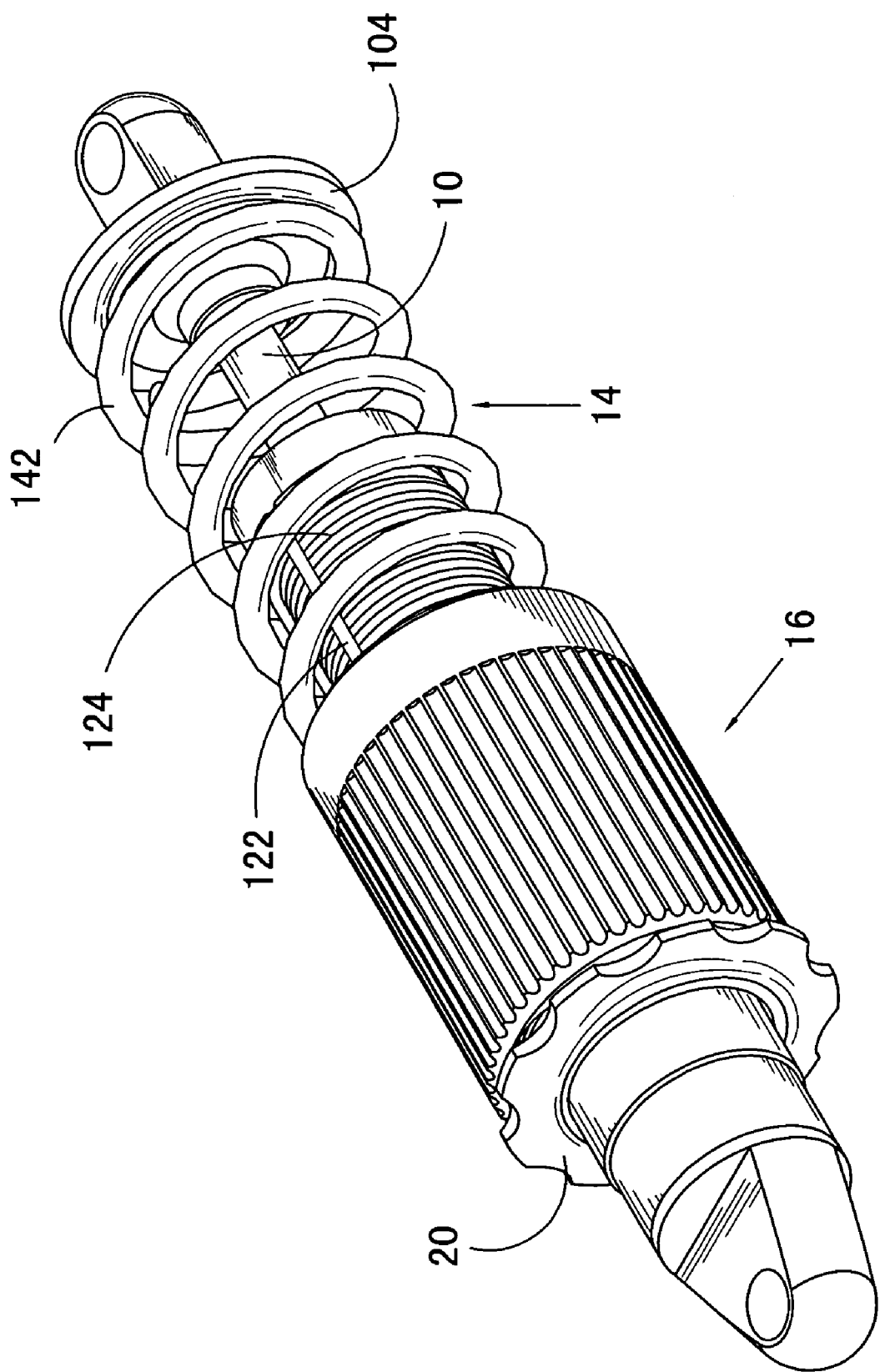
FIG. 2 is a 3D view of the adjusting mechanism with the helical spring of large diameter according to this invention.

As shown in FIGS. 1 and 2, respectively, showing an exploded view of an adjusting mechanism with a helical spring of large diameter according to this invention and a 3D view of the adjusting mechanism with the helical spring of large diameter according to this invention, the mechanism comprises a flexible inner tube 10, a flexible outer tube 12, a spring-fixed base 18, a helical spring 14 of large diameter, a rotation member 16, and a pre-compressive adjustment knob 20. The outer bore of one end of the flexible inner tube 10 works with the inner bore of flexible outer tube 12 to axially glide, so that a compressive stroke of the helical spring 14 of large diameter depends on the length thereof, and the outer bore of the other end of the flexible inner tube 10 is provided with a spring support seat 104 that contacts an open end of the helical spring 14 of large diameter, thereby the helical spring 14 of large diameter being kept pre-compressed. The inner bore of the flexible outer tube 12 works with the outer bore of flexible inner tube 10 to glide, so that the outer bore is formed with an axial groove 122 and a thread 124 and the axial groove 122 match with a screw 182 on the spring-fixed base 18 so as to make the spring-fixed base 18 axially shift only. The thread 124 of outer bore of the flexible outer tube 12 match with the thread 202 of inner bore of the pre-compressive adjustment knob 20 to adjust the predetermined compression of the helical spring 14 of large diameter.

One end of the helical spring 14 of large diameter forms a ringed end and is surfaced to contact the spring support seat 104 of the flexible inner tube 10 so that the helical spring 14 of large diameter is kept pre-compressed, while the other end of helical spring 14 is a wire end which is mounted to a spiral spring groove 184 of the spring-fixed base 18.

The spring-fixed base 18 is hollow to secure the helical spring 14 of large diameter, and its inner bore covers the flexible outer tube 12. The plurality of screws 182 are riveted and pierce through a tube wall of the spring-fixed base 18 and align with the axial groove 122 of the flexible outer tube 12 to make the spring-fixed base 18 axially shift only. The spiral spring groove 184 at the outer bore of the spring-fixed base 18 is a spiral groove having a thread pitch corresponding to that of the helical spring 14 of large diameter and of which the depth is smaller than the radius of coil 142. The wire end of the helical spring 14 of large diameter revolves around the spiral spring groove 184 and axially shifts so that the coil 142 is fixed into the whole spiral spring groove 184. The range of variation of the spring coefficient depends on the length of the spiral thread of the spiral spring groove 184, and the longer the spiral spring groove 184 becomes, the wider the range of variation of the spring coefficient of the helical spring 14 of large diameter grows. The rotation member 16 is hollow to adjust the number of compressed coils of the helical spring 14 of large diameter, namely the spring coefficient of the helical spring 14 of large diameter. The thread grooves 162 of the inner bore of the rotation member 16 are spiral grooves of which a thread pitch corresponds to that of the helical spring 14 of large diameter and of which the depth is smaller than the radius of coil 142, the helical spring 14 of large diameter being fixed onto the spring support seat 104. When the rotation member 16 rotates and axially shifts, its thread grooves 162 glide along the coil 142 of the helical spring 14 of large diameter. The thread grooves 162 of the inner bore of the rotation member 16 correspond to the turns of the helical spring 14 of large diameter, so that the number of compressed coils of the helical spring 14 of large diameter is changed. The pre-compressive adjustment knob 20 is hollow to adjust the predetermined compression of the helical spring 14 of large diameter, and the threads 202 of inner bore match with the thread of outer bore of the flexible outer tube. When the pre-compressive adjustment knob 20 rotates and axially shifts, the spring-fixed base 18 is pushed, the rotation member 16 axially shifts, and the predetermined compression of the helical spring 14 of large diameter is changed.

As shown in FIG. 2, a 3D view of the adjusting mechanism with the helical spring 14 of large diameter according to this invention, when the rotation member 16 rotates and axially shifts, its thread grooves 162 glide along the coil 142 of helical spring 14 of large diameter. The thread grooves 162 of inner bore of the rotation member 16 are formed to correspond to the turns of the helical spring 14 of large diameter, so that the number of compressed coils of the helical spring 14 of large diameter is changed thereby varying the spring coefficient of the helical spring 14 of large diameter. When the pre-compressive adjustment knob 20 rotates and axially shifts, the spring-fixed base 18 is pushed, the rotation member 16 axially shifts, and the predetermined compression of the helical spring 14 of large diameter is changed.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An adjusting mechanism with a helical spring of large diameter, comprising:
   a helical spring of large diameter of which one end forms a wire end and the other end forms a ringed end;
   a flexible inner tube, an outer bore of one end of the flexible inner tube works with an inner bore of flexible outer tube to axially glide and the other end of the flexible inner tube is provided with a spring support seat that contacts a surface of a ringed end of the helical spring of large diameter;
   a flexible outer tube, in which the inner bore works with the outer bore of the flexible inner tube to glide, the outer bore is the formed with an axial groove and a thread, in which the axial groove match with a screw that is fixed to and pierces through a tube wall of a spring-fixed base;
   a pre-compressive adjustment knob that is hollow, of which a thread of an inner bore of the pre-compressive adjustment knob match with the thread of the outer bore of the flexible outer tube;
   a spring-fixed base that is hollow, of which the inner bore covers the outer bore of the flexible outer tube and the outer bore is formed with a spiral spring groove and a plurality of screws which pierce through a tube wall of the spring-fixed base, in which the helical spring of large diameter of the wire end is fixed to the whole spiral spring groove; and
   a rotation member being hollow, of which the inner bore is formed with a thread groove corresponding to a shape the helical spring of large diameter fixed to the spring-fixed base.

2. The adjusting mechanism with the helical spring of large diameter according to claim 1, wherein when the pre-compressive adjustment knob rotates and axially shifts, the spring-fixed base is pushed, the rotation member axially shifts, and the predetermined compression of the helical spring of large diameter is changed.

3. The adjusting mechanism with the helical spring of large diameter according to claim 1, wherein the plurality of screws are riveted and pierce through the tube wall of the spring-fixed base and align with the axial groove of the flexible outer tube to make the spring-fixed base axially shift only.

4. The adjusting mechanism with the helical spring of large diameter according to claim 1, wherein when the rotation member rotates and axially shifts, its thread grooves glide along the coil of the helical spring of large diameter, and the thread grooves of the inner bore of the rotation member correspond to a shape of the helical spring of large diameter that is fixed to the spring-fixed base, so a number of compressed coils of the helical spring of large diameter is changed.

5. The adjusting mechanism with the helical spring of large diameter according to claim 1, wherein the thread grooves of the inner bore of the rotation member are spiral grooves having a thread pitch corresponding to that of the helical spring of large diameter and of which a depth is smaller than a radius of the coil.

6. The adjusting mechanism with the helical spring of large diameter according to claim 1, wherein the spiral spring groove at the outer bore of the spring-fixed base is a spiral groove of which a thread pitch corresponds to that of the helical spring of large diameter and of which a depth is smaller than a radius of the coil.

7. The adjusting mechanism with the helical spring of large diameter according to claim 1, wherein the range of adjustment of the spring coefficient depends on the length of a spiral thread of the spiral spring groove, and the longer the spiral spring groove becomes, the wider the range of variation of the spring coefficient of the helical spring of large diameter grows.

* * * * *